(12) United States Patent
Harada

(10) Patent No.: US 6,553,454 B1
(45) Date of Patent: Apr. 22, 2003

(54) STORAGE DEVICE AND METHOD OF REORDERING COMMANDS FROM A COMMAND QUEUE

(75) Inventor: Daisuke Harada, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/488,510

(22) Filed: Jan. 20, 2000

(30) Foreign Application Priority Data

Jul. 23, 1999 (JP) .......................................... 11-209711

(51) Int. Cl.[7] .............................................. G06F 12/00
(52) U.S. Cl. ........................... 711/111; 711/112; 710/52
(58) Field of Search ....................... 711/111, 112–113, 711/167; 710/43–52

(56) References Cited

U.S. PATENT DOCUMENTS

| | | | | |
|---|---|---|---|---|
| 4,583,166 A | * | 4/1986 | Hartung et al. ............. | 711/113 |
| 5,548,795 A | * | 8/1996 | Au ............................... | 710/52 |
| 5,664,143 A | * | 9/1997 | Olbrich ....................... | 711/112 |
| 5,729,718 A | * | 3/1998 | Au ............................... | 711/167 |
| 6,272,565 B1 | * | 8/2001 | Lamberts ..................... | 710/43 |

FOREIGN PATENT DOCUMENTS

JP 9128159 5/1997

* cited by examiner

*Primary Examiner*—Do Hyun Yoo
*Assistant Examiner*—Nasser Moazzami
(74) *Attorney, Agent, or Firm*—Greer, Burns & Crain, Ltd.

(57) ABSTRACT

In the storage device, a buffer memory stores a command queue consisting of a plurality of commands received from a host. A control section searches a command to be executed next to a command which is being executed from the command queue according to a predetermined condition, and then performs rearrangement of the commands in the command queue such that. The predetermined condition is that, the time required to move the head, which head performs reading/writing on the magnetic disk, to the magnetic disk after the execution of the command which is being executed is finished is not longer than a predetermined time.

6 Claims, 12 Drawing Sheets

US 6,553,454 B1

STORAGE DEVICE AND METHOD OF REORDERING COMMANDS FROM A COMMAND QUEUE

FIELD OF THE INVENTION

The present invention relates to a storage device used as an external storage device for a computer or the like. More particularly, this invention relates to a storage device which can shorten a time required for a rearrangement process of commands and can shorten a time required for access to a magnetic disk.

BACKGROUND OF THE INVENTION

As an external storage device for a computer or the like, a storage device using a large-capacity magnetic disk as a recording medium is popularly used. The density of storage devices of this type is increasing year by year with the improvement in the characteristic of the magnetic disks, the magnetic heads, and the like. With such an increase in the density, it is required that access time and processing is shortened. An effective solution for this is aspired after.

FIG. 9 is a block diagram showing the configuration of a conventional storage device 10. As shown in FIG. 9, the storage device 10 is connected to a host 30 such as a computer through SCSI (small computer system interface). The storage device 10 performs a write operation, a read operation, and the like on the basis of a command (for example, write command or read command) from the host 30. The write operation here means an operation for writing data on a magnetic disk 17 (to be described later), and the write command is a command for executing this write operation. On the other hand the read operation means an operation for reading data from the magnetic disk 17, and the read command is a command for executing the read operation.

The command is described in a form widely known as CDB (command descriptor block), and includes a command code representing the type of the command and information such as an address on the magnetic disk 17 in execution of the command. A control section 11 performs analysis of a command received from the host 30 through an I/F section 12, transmission of a status to the host 30, queuing of the commands, rearrangement of commands, and the like. Queuing of the commands is an operation of adding commands sequentially issued from the host 30 to a command queue $Q_1$ shown in FIG. 10. The command queue $Q_1$ is stored in a buffer memory 13, and the commands are sequentially executed from the start command of the command queue $Q_1$.

In an example shown in FIG. 10, the command queue $Q_1$ consists of four commands, that is, Commands $C_1$ to $C_4$. The rearrangement of commands is a process of selecting a command to be executed next to a command under execution from the command queue $Q_1$ and moving the selected command to the header of the command queue $Q_1$. In this case, the command to be selected is a command with the shortest seek time explained later.

Returning back to FIG. 9, the buffer memory 13 temporarily stores the command queue $Q_1$, data read from the magnetic disk 17, and data to be written on the magnetic disk 17. A command execution section 14 sequentially executes the command from the start in command queue $Q_1$ command to perform control for reading data from the magnetic disk 17 or writing data on the magnetic disk 17. A read/write section 15 comprises a modulation circuit (not shown) for modulating data to be written on the magnetic disk 17, a parallel/serial conversion circuit for converting parallel data into serial data, a demodulation circuit (not shown) for demodulating data read from the magnetic disk 17, and the like.

A head 16 is arranged to be close to the magnetic disk 17, which writes data on and reads data from the magnetic disk 17. More specifically, the head 16 writes data on the magnetic disk 17 using a magnetic field generated by a recording current supplied to a coil (not shown) in the write operation, and magnetically detects, as a reproduced voltage, the data recorded on the magnetic disk 17. The head 16 is moved along the recording surface of the magnetic disk 17 by a voice coil motor ("VCM") 18.

The magnetic disk 17 is a disk-like recording medium on which data is magnetically recorded, and is rotationally driven at a high speed by an spindle motor ("SPM") 19. A servo section 20 controls drive currents supplied to the VCM 18 and the SPM 19 to perform positioning control of the head 16 with respect to the magnetic disk 17.

An operation of the conventional storage device 10 will be explained below with reference to FIGS. 10, 11, and 12. The rearrangement process of commands will be explained first. When commands are sequentially transmitted from the host 30 shown in FIG. 9, these commands are sequentially input to the control section 11 through the I/F section 12. The control section 11 then analyses the commands and queues the commands into a command queue in the buffer memory 13 in the input order. The command execution section 14 executes the start command of the command queue.

In this case, a command $C_0$ shown in FIG. 12 is executed by the command execution section 14, and the command queue $Q_1$ shown in FIG. 10 is stored in the buffer memory 13. More specifically, as shown in FIG. 12, it is assumed that the head 16 is on a track $TR_1$ of the magnetic disk 17 and that data is read from a sector of, for example, the track $TR_1$ depending on the command $C_0$. The command queue $Q_1$ shown in FIG. 10 consists of the command $C_1$ to $C_4$.

As described above, in execution of the command $C_0$, the control section 11 shown in FIG. 9 executes the rearrangement process of commands according to the flowchart shown in FIG. 11. More specifically, in step SA1 shown in FIG. 11, the control section 11 initializes the command C, at the start of the command queue $Q_1$ (see FIG. 10) as an optimum solution command and initializes the next command $C_2$ as a compared command. The control section 11 then proceeds to step SA2. In this case, the optimum solution command is a command executed next to the command $C_0$ under execution. The optimum solution command is a command in which a seek time of the head 16 after the execution of the command $C_0$ is the shortest in the command queue $Q_1$.

The command to be initialized as the optimum solution command is a command which can be rearranged in the command queue $Q_1$, for example, read command, or write command. When the start command of the command queue $Q_1$ is a command which cannot be rearranged, a command which is queued below the start command and closest to the start command is initialized as the optimum solution command.

In step SA2, the control section 11 determines whether or not a compared command (=command $C_2$) is a command that can be rearranged (a read command, a write command, or the like) If the result of determination in step SA2 is "Yes", then the control section 11 proceeds to step SA3. If the result of determination in step SA2 is "No", then the control section 11 proceeds to step SA7.

In step SA3, the control section 11 calculates the physical address of an optimum solution command (=command $C_1$) and the physical address of a compared command (=command $C_2$), and then proceeds to step SA4. The physical address of the optimum solution command is a position of the head 16 on the magnetic disk 17 shown in FIG. 12 when execution of the optimum solution command is started. Similarly, the compared command is a position of the head 16 on the magnetic disk 17 when execution of the compared command is started.

The control section 11 calculates a first seek time $T_1$ of the optimum solution command and a second seek time $T_2$ of the compared command in step SA4, and then proceeds to step SA5. The first seek time $T_1$ is a time from when execution of a command under execution (in this case, the command $C_0$) is finished to the time when execution of the optimum solution command (in this case, the command $C_1$) is started. In other words, the first seek time $T_1$ is a time required for movement of the head 16 from a point a at which the head 16 is located when the command $C_0$ under execution shown in FIG. 12 is finished to a point where execution of the optimum solution command is started.

Similarly, the second seek time $T_2$ is a time from when execution of the command under execution (in this case, the command $C_0$) is finished to the time when execution of the compared command (in this case, the command $C_2$) is started. In other words, the second seek time $T_2$ is a time required for movement of the head 16 from the point a at which the head 16 is located when the command $C_0$ under execution shown in FIG. 12 is finished to a point where execution of the compared command is started.

In step SA5, the control section 11 determines whether or not the second seek time $T_2$ is shorter than the first seek time $T_1$. If the result of determination in step SA5 is "No", then the control section 11 proceeds to step SA7. If the result of determination in step SA5 is "Yes", then the control section 11 proceeds to step SA6. The control section 11 registers the compared command as an optimum solution command in step SA6, then the control section 11 proceeds to step SA7.

In step SA7, the control section 11 determines whether or not a comparing operation performed such that a final command (in this case, the command $C_4$) in the command queue $Q_1$ (see FIG. 10) is used as a compared command is finished. In this case, the control section 11 determines the result as "No", and then proceeds to step SA8. The control section 11 considers the next command $C_3$ in the command queue $Q_1$ (see FIG. 10) as a compared command in step SA8, and then proceeds to step SA2.

Thereafter, in step SA2 and subsequent steps, as in the same operations as explained above, the process which uses the commands $C_2$, $C_3$ as compared commands is executed. When the command $C_4$ (final command) shown in FIG. 10 is used as a compared command in step SA8, the control section 11 determines in step SA2 whether or not the compared command (=command $C_4$) is a command that can be rearranged (a read command, a write command, or the like). In this case, assuming that the result of determination in step SA2 is "Yes", the control section 11 proceeds to step SA3.

The control section 11 calculates the physical address of an optimum solution command (for example, command $C_1$) and the physical address of a compared command (=command $C_4$) in step SA3, and then the control section 11 proceeds to step SA4. The control section 11 calculates the first seek time $T_1$ of the optimum command (=command $C_1$) and the second seek time $T_1$ of the compared command (=command $C_4$) in step SA4, and then the control section 11 proceeds to step SA5.

In step SA5, the control section 11 determines whether or not the second seek time $T_2$ is shorter than the first seek time $T_1$. In this case, the result of determination is assumed as "Yes", the control section 11 proceeds to step SA6. The control section 11 registers the compared command (=command $C_4$) as an optimum solution command in step SA6, and then the control section 11 proceeds to step SA7.

In step SA7, the control section 11 determines whether or not a comparing operation performed such that a final command (in this case, the command $C_4$) in the command queue $Q_1$ (see FIG. 10) is used as a compared command is finished. In this case, the control section 11 determines the result as "Yes", and then proceeds to step SA9. In step SA9, the control section 11, as shown in FIG. 10, moves the optimum solution command (=commands $C_4$) from the present position to the start position in the command queue $Q_1$.

When the execution of the command $C_0$ under execution is finished as shown in FIG. 12, the command execution section 14 executes the start commands $C_4$ (=optimum solution command) of the command queue $Q_1$ shown in FIG. 10 in step SA10. At this time, it is assumed that the head 16 is located at a point a on the track $TR_1$. The servo section 20 controls the VCM 18 under the control of the command execution section 14 to move the head 16 shown in FIG. 12 in a Y direction.

In this manner, the head 16 is moved from the track $TR_1$ to a track $TR_3$. This track $TR_3$ is a track on which the command $C_4$ (optimum solution command) is executed. Since the magnetic disk 17 moves in an X direction while the head 16 moves, the head 16 moves to draw a locus $S_1$ extending from the point a to a point b. When the head 16 is located at the point b, the movement of the head 16 is stopped, the head 16 waits for rotation of the magnetic disk 17. When the head 16 is located at a point c, the command $C_4$ is executed.

As described above, in the conventional storage device, comparing operations for determining the optimum solution commands of all the commands $C_1$ to $C_4$ constituting the command queue $Q_1$ shown in FIG. 10 is performed. However, in the conventional storage device, as the number of commands constituting a command queue increases, the number of times of the comparing operations increases accordingly. Therefore, a longer time is required to calculate optimum solution commands and to finish rearrangement of the commands.

For example, in a command queue $Q_2$ consisting of seven commands $C_1$ to $C_7$ shown in FIG. 10 and having an optimum solution command (in this case, a commands $C_4$) located at the end of the command queue $Q_2$, the head 16 shown in FIG. 12 exceeds an seek region A within a predetermined time until the optimum solution command (=command $C_4$) is determined, and overhead in which the magnetic disk 17 rotates once (or rotates twice or more) occurs. In this case, the seek region A within a predetermined time is a region in which the head 16 is located when the head 16 moves for a predetermined time. More specifically, in the conventional storage device, comparing operations for determining optimum solution commands of all the commands constituting a command queue. Therefore, as the number of commands increases, the time required for a rearrangement process of the commands becomes longer. In addition, when overhead occurs, a time required for access to the magnetic disk 17 is disadvantageously long.

Further, in the conventional storage device, a command queue is stored in the buffer memory 13 having a relatively low access speed, and the commands are rearranged by accessing the buffer memory 13. Thus, as the number of commands constituting the command queue increases, a total of access times becomes long. Therefore, a long time is required for a rearrangement process of the commands.

SUMMARY OF THE INVENTION

The present invention has been made in light of the problems described. It is an object of the present invention to provide a storage device which can shorten a time for a rearrangement process of commands and which can shorten a time for requiring access to a magnetic disk.

According to a first aspect of the present invention, when a command is executed, a searching unit searches a command to be executed next from a command queue according to a predetermined condition. When the searching unit finds a command in which the time depending on the relative movement distance between a head and a recording medium is not longer than a predetermined time, a rearrangement unit rearranges the command queue such that this command is preferentially executed.

Thus, even if all the commands in the command queue are not searched, when a command satisfying the predetermined condition is found, the commands are rearranged such that the command is preferentially executed. Therefore, a time required for a rearrangement process of commands can be made shorter than that in a conventional device in which all commands in a command queue are subjected to searching.

Further, since the commands are repeatedly rearranged when the searching time is left when the command is searched by the searching unit, searching precision can be improved.

According to a second aspect of the invention, when a command is executed, a searching unit searches a command to be executed next from a command queue according to a predetermined condition. When the searching unit finds a special command in the command queue, a rearrangement unit rearranges the command queue such that this special command is preferentially executed.

Since rearrangement of the commands is performed such that the special command which can immediately return a status response to the host is executed in preference to the other commands, the number of commands in the command queue can be quickly reduced. Therefore, a time required for rearrangement of the commands to be executed later can be shortened.

According to a third aspect of the present invention, commands are separated into a first command information and a second command information, and the second command information required for a rearrangement process is stored in a second memory which can be accessed at a high speed to access the second memory, so that the execution orders of the commands are rearranged. Therefore, since a time required for access to the second memory can be made shorter than that in a conventional storage device, a time required for a rearrangement process of the commands can be shortened.

Other objects and features of this invention will become apparent from the following description with reference to the accompanying drawings.

DESCRIPTION OF THE PREFERRED EMBODIMENTS

First to third embodiments of a storage device according to the present invention will be described below with reference to the accompanying drawings.

Figure 1:
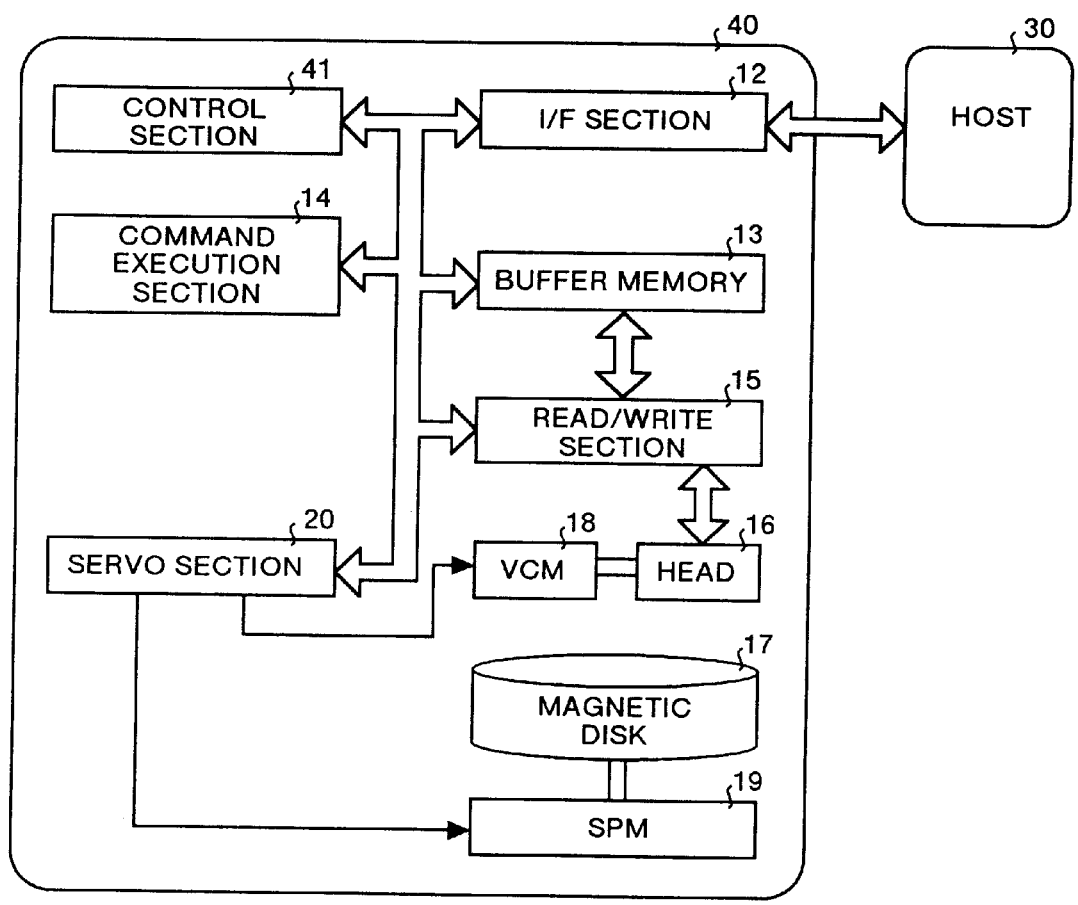
FIG. 1 is a block diagram showing the configuration of first and second embodiments according to the present invention.

FIG. 1 is a block diagram showing the configuration of a first embodiment according to the present invention. The same reference numerals as in FIG. 9 denote the corresponding parts in FIG. 1, and a description thereof will be omitted. In a storage device 40 shown in FIG. 1, a control section 41 is arranged in place of the control section 11 shown in FIG. 9. Like the control section 11 (see FIG. 9), the control section 41 performs analysis of commands received from a host 30 through an I/F section 12, transmission of a status to the host 30, queuing of the commands, rearrangement of the commands and the like. The command rearrangement process in the control section 41 is different from the command rearrangement process in the control section 11 as explained later.

An operation of the first embodiment will be described below with reference to FIGS. 2, 3, and 4. The rearrangement process of the commands described above will be explained below. When commands are sequentially transmitted from the host 30 shown in FIG. 1, these commands are sequentially input to the control section 41 through the I/F section 12. In this manner, the control section 41 analyses the commands, and then queues the commands into a command queue in the buffer memory 13 in the input order. The command execution section 14 executes the start command of the command queue.

Figure 2:
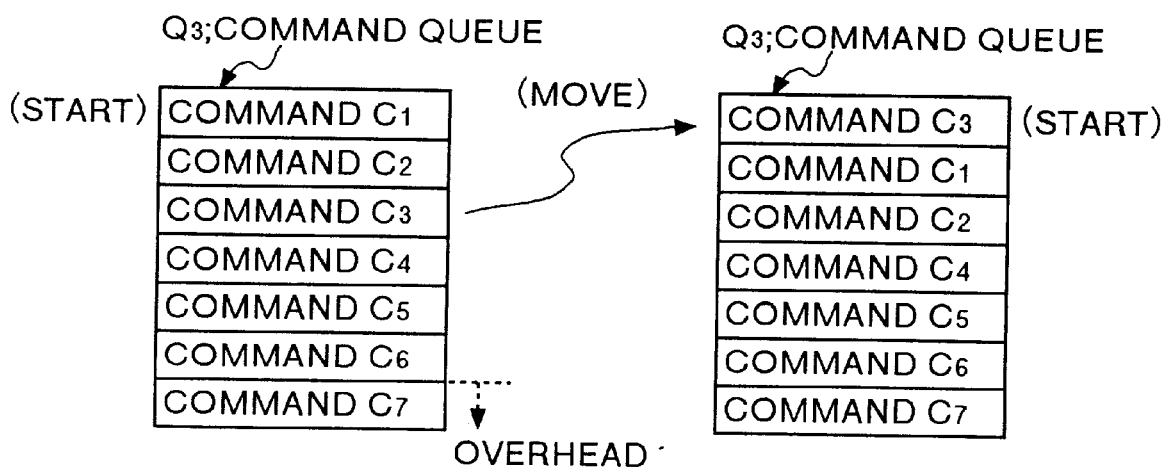
FIG. 2 is a diagram for explaining a command rearrangement process in the first and second embodiments.
Figure 4:
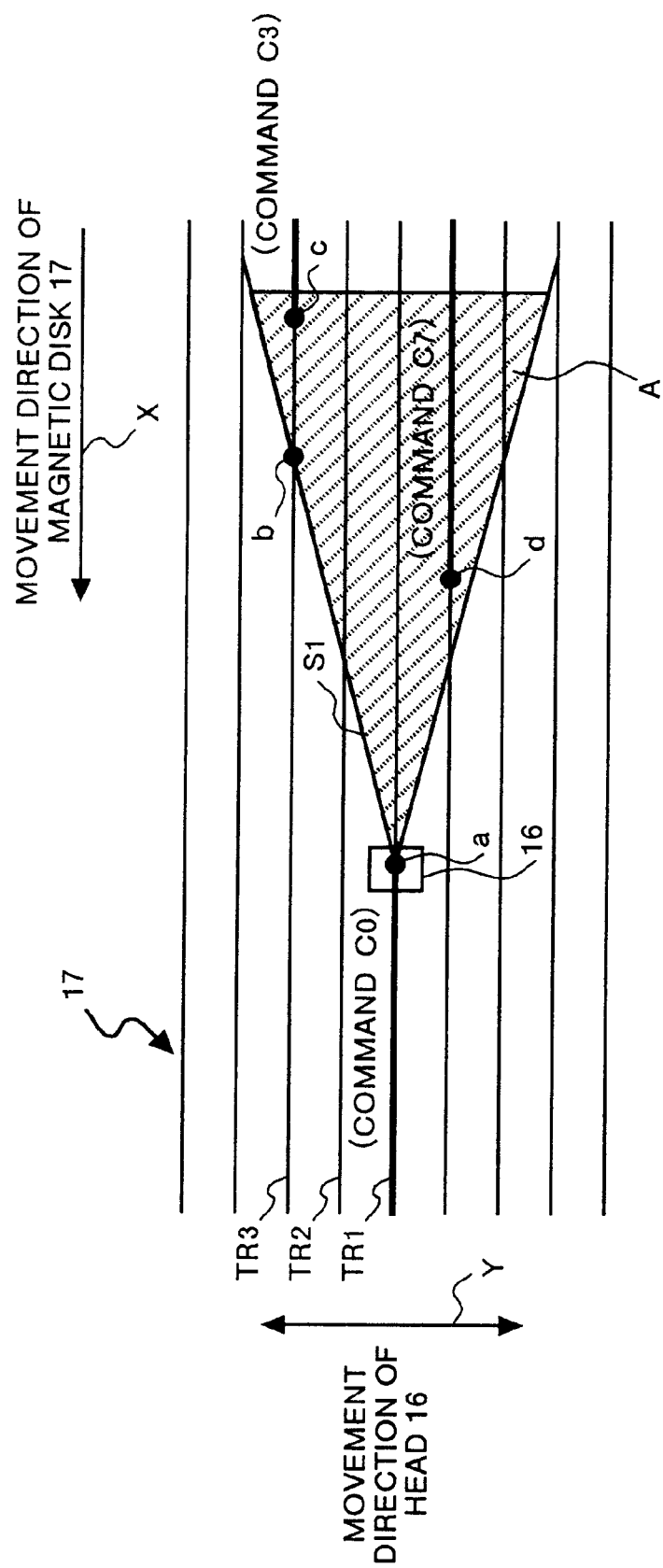
FIG. 4 is a diagram showing a seek operation in the first embodiment.

Here, it is assumed that a command $C_0$ shown in FIG. 4 is executed by the command execution section 14, and that a command queue $Q_3$ shown in FIG. 2 is stored in the buffer memory 13. More specifically, as shown in FIG. 4, it is assumed that a head 16 is on a track $TR_1$ of a magnetic disk 17. The command queue $Q_3$ shown in FIG. 2 consists of a command $C_1$ to a command $C_7$.

Figure 3:
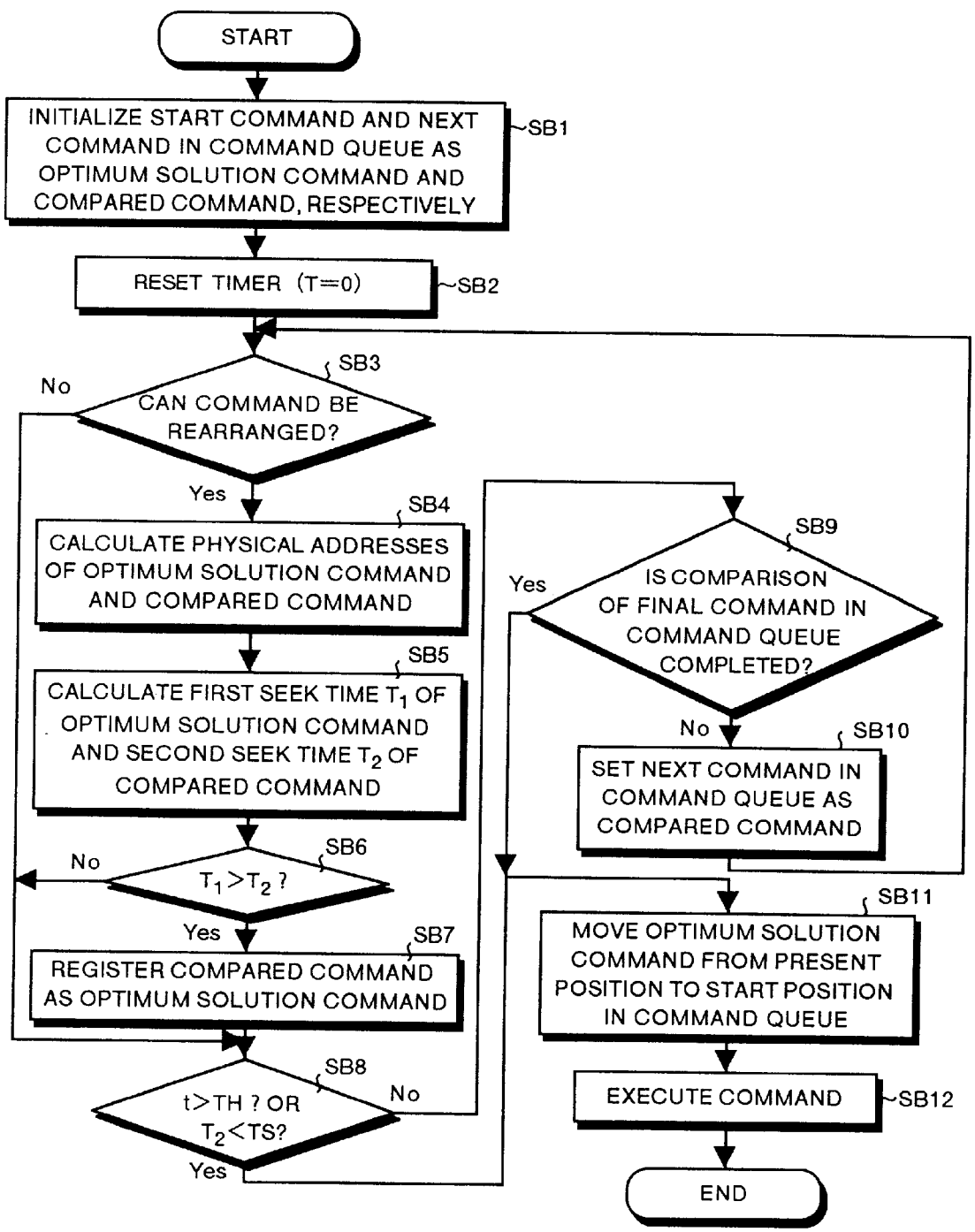
FIG. 3 is a flowchart showing a command rearrangement process in the first embodiment.
Figure 11:
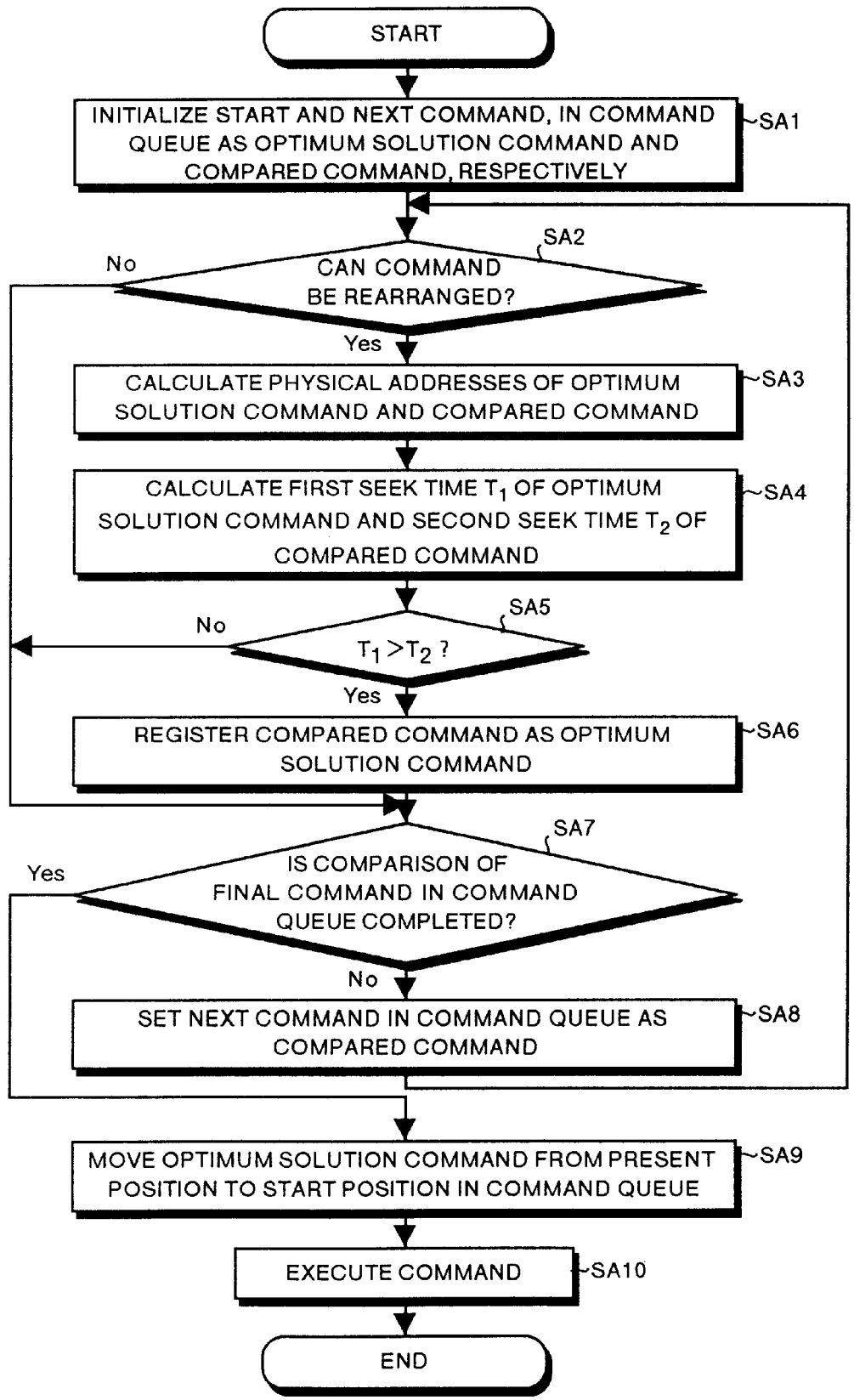
FIG. 11 is a flowchart showing a command rearrangement process in the conventional storage device 10.
Figure 12:
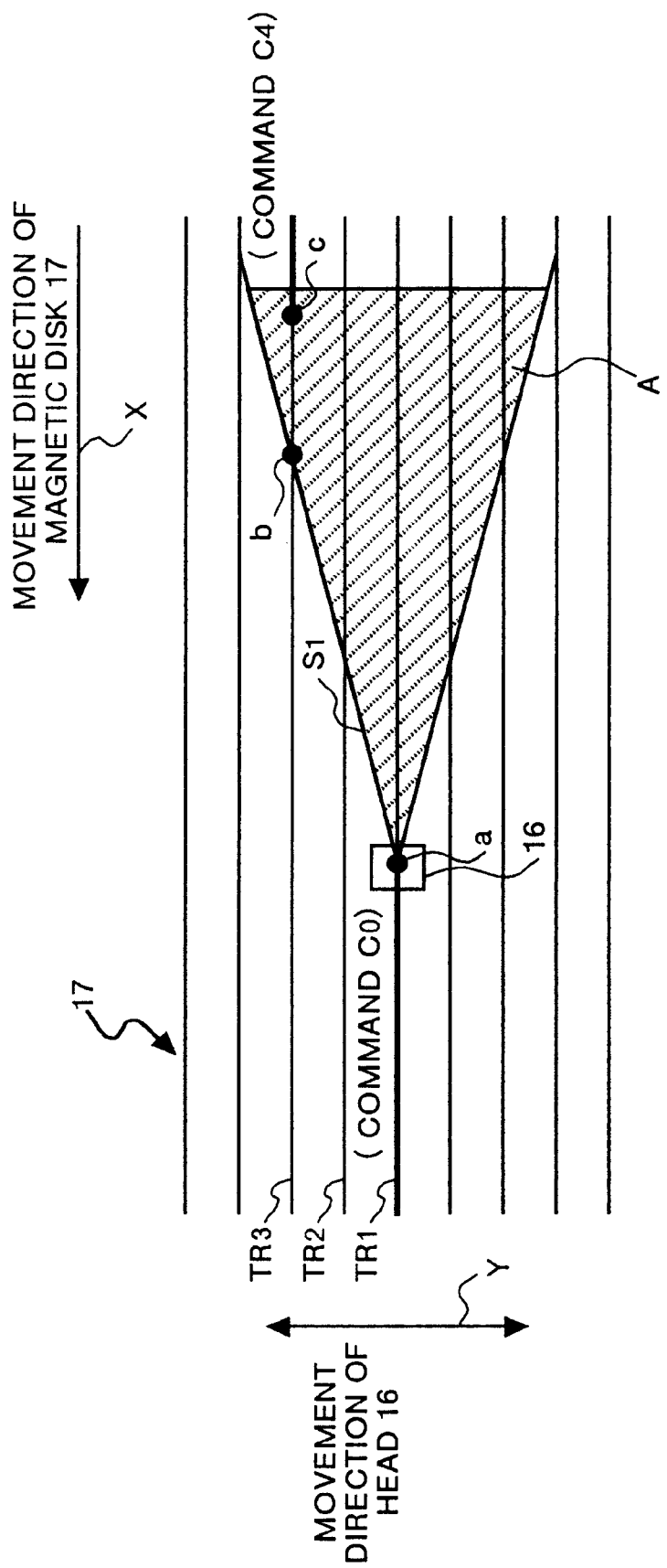
FIG. 12 is a diagram showing a seek operation in the conventional storage device 10.

As explained above, during execution of the command $C_0$, the control section 41 shown in FIG. 1 executes a rearrangement process of the commands according to the flowchart shown in FIG. 3. More specifically, in step SB1 shown in FIG. 3, as well as in step SA1 (see FIG. 11), the control section 41 initializes the start command $C_1$ in the command queue $Q_3$ (see FIG. 2) as an optimum solution command, and initializes the next command $C_2$ as a compared command. Thereafter, the control section 41 proceeds to step SB2.

The control section 41 resets a timer (not shown) to set a timer result to zero in step SB2, and then the control section 41 proceeds to step SB3. In step SB3, the control section 41 checks whether or not a compared command that can be rearranged (=command $C_2$) is a command (read command, write command, or the like). If the result of determination is "Yes", then the control section 41 proceeds to step SB4. If the result of determination in step SB2 is "No"3, then the control section 41 proceeds to step SB8.

In step SB4, as well as in step SA3 (see FIG. 11), the control section 41 calculates the physical address of an optimum solution command (=command $C_1$) and the physical address of a compared command (=command $C_2$). Thereafter, the control section 41 proceeds to step SB5. The physical address of the optimum solution command is a position of the head 16 on the magnetic disk 17 shown in FIG. 4 when execution of the optimum solution command is started. Similarly, the physical address of the compared command is a position of the head 16 on the magnetic disk 17 when execution of the compared command is started.

The control section 41 calculates a first seek time $T_1$ of the optimum solution command (=command $C_1$) and a second seek time $T_2$ of the compared command (=command $C_2$) in step SB5, and then proceeds to step SB6. In this case, the first seek time $T_1$ is a time required for movement of the head 16 from a point at which the head 16 is located when the command $C_0$ under execution shown in FIG. 4 is finished to a point where execution of the optimum solution command (=command $C_1$) Similarly, the second seek time $T_2$ is a time required for movement of the head 16 from the point a at which the head 16 is located when the command $C_0$ under execution shown in FIG. 4 is finished to a point where execution of the compared command (=command $C_2$).

In step SB6, the control section 41 determines whether or not the second seek time $T_2$ is shorter than the first seek time $T_1$. If the result of the determination is "No", then the control section 41 proceeds to step SB8. If the result of the determination in step SB6 is "Yes", then the control section 41 proceeds to step SB7. The control section 41 registers the compared command as an optimum solution command in step SB7, and then proceeds to step SB8.

In step SB8, the control section 41 determines whether or not the timer result t of the timer exceeds a threshold time TH or whether or not the second seek time $T_2$ of the compared command registered as the optimum solution command in step SB7 is shorter than a threshold time TS. In this case, the threshold time TH is a time between time when the command $C_0$ under execution is executed and time when the execution is ended. The threshold time TS is a time depending on a relative movement distance between the head 16 and the magnetic disk 17 after the command $C_0$ under execution is ended, for example, 1 ms. Therefore, within the threshold time TS, the head 16 is located at any point in an seek region A within a predetermined time by using the point a as a start point. In this case, assuming that the result of determination in step SB8 is "No", the control section 41 proceeds to step SB9.

In step SB9, the control section 41 determines whether or not comparison using a final command (in this case, the command $C_7$) in the command queue $Q_3$ (see FIG. 2) as a compared command is ended. In this case, the control section 41 determines the result as "No", and then proceeds to step SB10. The control section 41 sets the next command $C_3$ in the command queue $Q_3$ (see FIG. 2) as a compared command in step SB10, and then proceeds to step SB3.

In step SB3, as in the same operation as explained above, the control section 41 determines whether or not the compared command (=command $C_3$) is a command which can be rearranged. In this case, assuming that the result of determination is "Yes", the control section 41 proceeds to step SB4. The control section 41 calculates the physical address of an optimum solution command (for example, command $C_1$) and the physical address of a compared command (=command $C_3$) in step SB4, and then proceeds to step SB5. The control section 41 calculates the first seek time $T_1$ of an optimum solution command (=command $C_1$) and the second seek time $T_2$ of the compared command (command $C_3$) in step SB5, and then proceeds to step SB6.

In step SB6, the control section 41 determines whether or not the second seek time $T_2$ is shorter than the first seek time $T_1$. In this case, assuming the result of determination to be "Yes", the control section 41 proceeds to step SB7. The control section 41 registers the compared command (=command $C_3$) as an optimum solution command instep SB7, and then proceeds to step SB8.

In step SB8, the control section 41 determines whether or not the timer result t of the timer exceeds the threshold time TH or whether or not the second seek time $T_2$ of the compared command registered as the optimum solution command in step SB7 is shorter than the threshold time TS. In this case, if the result of the determination in step SB7 is that the second seek time $T_2$ of the compared command (=command $C_3$) as the optimum solution command is shorter than the threshold time TS, the control section 41 determines the result in step SB8 as "Yes", and then proceeds to step SB11. It must be attentive that comparison between the optimum solution command and the compared command is ended without setting the commands $C_4$ to $C_7$ as compared commands in the command queue $Q_3$.

In step SB11, as shown in FIG. 2, the control section 41 moves the optimum solution command (=command $C_3$) from the present position to the start position in the command queue $Q_3$. As shown in FIG. 4, upon completion of the execution of the command $C_0$ under execution, in step SB12, the command execution section 14 executes the command $C_3$ (=optimum solution command) at the start of the command queue $Q_3$ shown in FIG. 2. At this time, it is considered that the head 16 is located at the point a on the track $TR_1$. The servo section 20 controls a VCM 18 under the control of the command execution section 14, thereby moving the head 16 shown in FIG. 4 in a Y direction.

In this manner, the head 16 moves from the track $TR_1$ to a track $TR_3$. The track $TR_3$ is a track on which the command $C_3$ (=optimum solution command) is executed. During movement of the head 16, since the magnetic disk 17 moves in an X direction, the head 16 moves to draw a locus $S_1$ extending from the point a to the point b. When the head 16 is located at the point b in the seek region A with a predetermined time, the head 16 waits for rotation of the magnetic disk 17. When the head 16 is located at a point c, the command $C_3$ is executed.

In step SB8, when the timer result t of the timer exceeds the threshold time TH, the control section 41 determines the result as "Yes", and then proceeds to step SB11. More specifically, in this case, before the final command (=command $C_7$) in the command queue $Q_3$ shown in FIG. 2 is set as a compared command, comparison between the optimum solution command and the compared command is ended.

In step SB11, as shown in FIG. 2, the control section 41 moves the optimum solution command at time when the timer result t of the timer exceeds the threshold value from the present position to the start position in the command queue $Q_3$. As shown in FIG. 4, upon completion of the execution of the command $C_0$ which is being executed at present, in step SB12, the command execution section 14 executes the command (=optimum solution command) at the start of the command queue $Q_3$ shown in FIG. 2.

As explained above, according to the first embodiment, even in a case where all the commands in the command queue are not compared with a compared command, when a command satisfies a predetermined condition, the commands are rearranged such that the command is preferentially executed. For this reason, a time required for a rearrangement process of the commands can be made shorter than that in the conventional device in which all the commands in a command queue are subjected to searching.

In the first embodiment, if there is a spare time when an optimum solution command is determined, it is also possible to perform the process of determining a command used as a next optimum solution command, and then perform a rearrangement process of commands. In this case, an optimum solution command having better conditions can be determined.

The following case is explained in the first embodiment described above. That is, when a command in which the time depending on a relative movement distance between the head 16 and the magnetic disk 17 after the command $C_0$ under execution shown in FIG. 4 is smaller than the threshold time TS is found in the command queue $Q_3$, the command is set as an optimum solution command. In this case, if a command that can immediately respond a status to the host 30 (for example, a write cache command) exists in a command queue, this command can be executed in preference to the other commands. This case will be explained as a second embodiment of the invention below.

The configuration in the second embodiment is the same as that shown in FIG. 1. In the second embodiment, the function of the control section 41 shown in FIG. 1 is partially different from that in the first embodiment.

An operation of the second embodiment will be explained below with reference to FIGS. 2, 4, and 5. In this case, it is assumed that the command $C_0$ shown in FIG. 4 is executed by the command execution section 14, and that the command queue $Q_3$ shown in FIG. 2 is stored in the buffer memory 13. More specifically, the command queue $Q_3$ shown in FIG. 2 consists of commands $C_1$ to $C_7$. As described above, it is assumed that the command $C_3$ is a command that can immediately respond a status to the host 30 (for example, a write cache command). This command will be called a status immediate response enable command hereinafter. In this case, the write cache command is a command for designating that data from the host 30 is written in the buffer memory 13.

Figure 5:
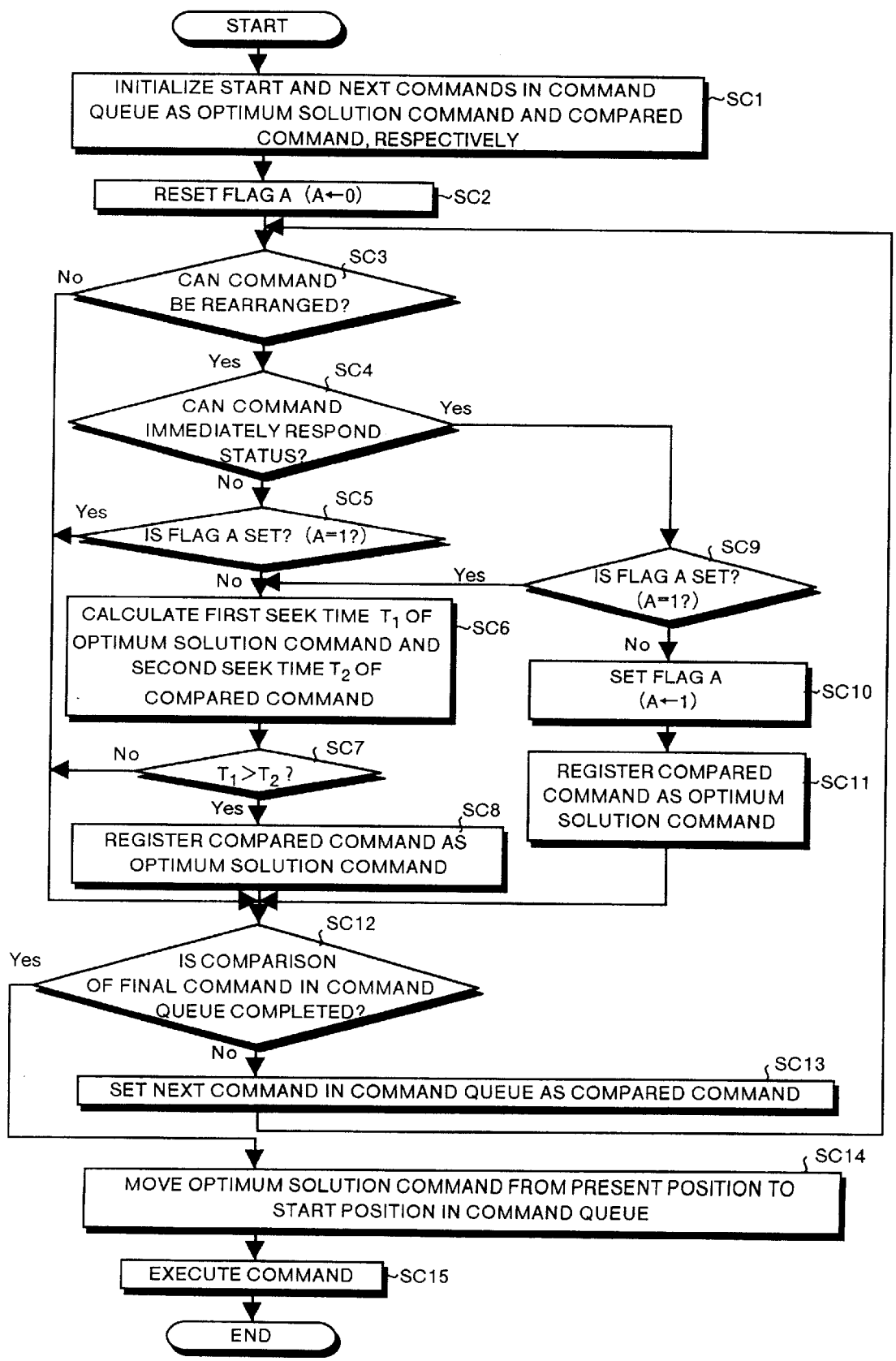
FIG. 5 is a flowchart showing a command rearrangement process in the second embodiment.

As explained above, during execution of the command $C_0$, the control section 41 shown in FIG. 1 executes a rearrangement process of commands according to the flowchart shown in FIG. 5. More specifically, in step SC1 shown in FIG. 5, the control section 41 initializes the command $C_1$ at the start in the command queue $Q_3$ (see FIG. 2) as an optimum solution command, and initializes the next command $C_2$ as a compared command. Thereafter, the control section 41 proceeds to step SC2.

The control section 41 resets a flag A, that is, substitutes 0 as the flag A in step SC2, and then proceeds to step SC3. In this case, the flag A is a flag representing whether or not the status immediate response enable command is present in the command queue $Q_3$ shown in FIG. 2. More specifically, when the flag A is 0, the flag A represents that no status immediate response enable command is present in the command queue $Q_3$. When the flag A is 1, the flag A represents that a status immediate response enable command is exists in the command queue $Q_3$.

In step SC3, the control section 41 determines whether or not a compared command (=command $C_2$) is a command that can be rearranged (read command, write command, status immediate response enable command, or the like). If the result of determination is "Yes", then the control section 41 proceeds to step SC4. If the result of determination in step SC3 is "No", then the control section 41 proceeds to step SC12.

In step SC4, the control section 41 determines whether or not a compared command (=command $C_2$) is a status immediate response enable command. In this case, assuming that the result of determination is "No", the control section 41 proceeds to step SC5. In step SC5, the control section 41 determines whether or not the flag A is set, that is, whether or not the flag A is 1. In this case, since the flag A is 0, the control section 41 determines the result in step SC5 as "No", and then proceeds to step SC6. If the result of determination in step SC5 is "Yes", then the control section 41 proceeds to step SC12.

In step SC6, as well as in step SA3 and step SA4 (see FIG. 11), the control section 41 calculates the physical address of an optimum solution command (=command $C_1$) and the physical of a compared command (=command $C_2$). The control section 41 calculates the first seek time T1 of the optimum solution command (command $C_1$) and the second seek time $T_2$ of the compared command (=command $C_2$), and then proceeds to step SC7.

In step SC7, the control section 41 determines whether or not the second seek time $T_2$ is shorter than the first seek time $T_1$. If the result of the determination is "No", then the control section 41 proceeds to step SC12. If the result of the determination is "Yes", then the control section 41 proceeds to step SC8. The control section 41 registers the compared command as the optimum solution command in step SC8, and then proceeds to step SC12.

In step SC12, the control section 41 determines whether or not comparison using a final command (in this case, the command $C_7$) in the command queue $Q_3$ (see FIG. 2) as a compared command is ended. In this case, the control section 41 determines the result as "No", and then proceeds to step SC13. In step SC13, the control section 41 sets the next command $C_3$ (=status immediate response enable command) in the command queue $Q_3$ (see FIG. 2) as the compared command, and then proceeds to step SC3.

In step SC3, as well as the same operation as explained above, the control section 41 determines whether or not the compared command (=command $C_3$) is a command that can be rearranged. In this case, since as the result of determination is "Yes", the control section 41 proceeds to step SC4. In step SC4, the control section 41 determines whether or not the compared command (=command $C_3$=status immediate response enable command) is a status immediate response enable command. In this case, since the result of the determination is "Yes", then the control section 41 proceeds to step SC9.

In step SC9, the control section 41 determines whether or not the flag A is set, that is, whether or not the flag A is 1. In this case, since the flag A is 0, the control section 41 determines the result as "No", and proceeds to step SC10. If the result of determination in step SC9 is "Yes", then the control section 41 proceeds to step SC6. The control section 41 sets the flag A, that is, substitutes 1 as the flag A in step SC10, and then proceeds to step SC11. The control section 41 registers the compared command (=command $C_3$=status immediate response enable command) as an optimum solution command in step SC11, and then proceeds to step SC12.

The control section 41 determines the result as "No" in step SC12, and then proceeds to step SC13. The control section 41 determines the next command $C_4$ in the command queue $Q_3$ (see FIG. 2) as a compared command in step SC13 to return to step SC3. Subsequently, the operation as described above is repeated. More specifically, in this case, since the flag A is 1, at the point that the result of determination in step SC12 becomes "Yes", the optimum solution command is a status immediate response enable command (for example, the command $C_3$: see FIG. 2).

In step SC14, as shown in FIG. 2, the control section 41 moves the optimum solution command (=command $C_3$=status immediate response enable command) from the present position (see FIG. 2) to the start position in the command queue $Q_3$. Upon completion of execution of the command $C_0$ under execution at present, in step SC15, the command execution section 14 executes the command (=status immediate response enable command) at the start of the command queue $Q_3$ shown in FIG. 2. In this manner, the command execution section 14 writes data in the buffer memory 13. The control section 41 transmits a status representing completion to the host 30 through the I/F section 12 and a not shown SCSI, and deletes the command $C_3$ at the start position.

As described above, according to the second embodiment, since commands are rearranged such that a status immediate response enable command which can immediately return a status response to the host 30 is executed in preference to the other commands, the number of commands in the command queue can be quickly reduced. Therefore, a time required for rearrangement of the commands that will be performed later can be shortened. In addition, according to the second embodiment, since the status is immediately returned to the host 30 by the status immediate response enable command, a wait time of the host 30 can be shortened.

Figure 6:
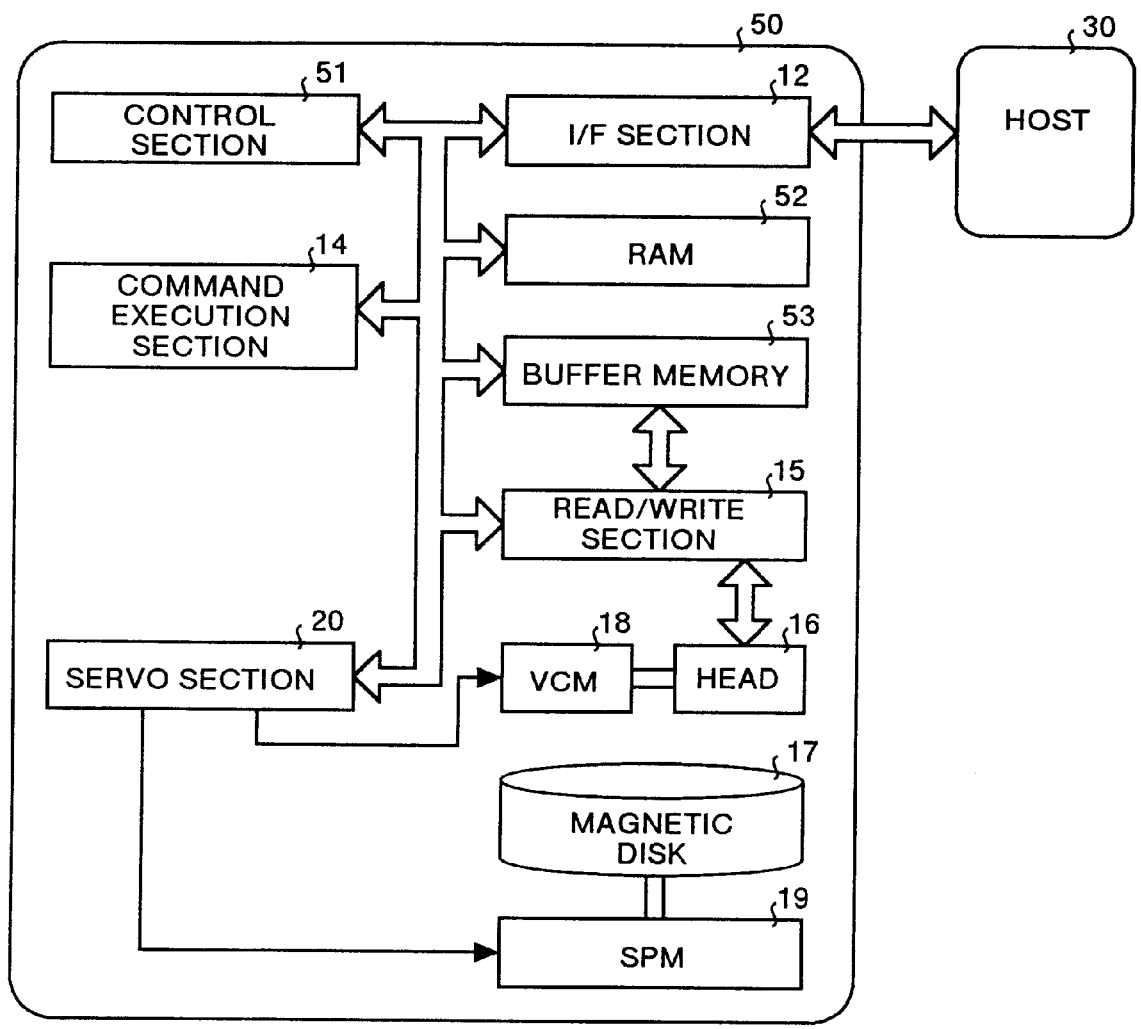
FIG. 6 is a block diagram showing the configuration of a third embodiment according to the present invention.

In the first and second embodiments explained above, the following example is explained. That is, a series of commands from the host 30 are stored as a command queue in the buffer memory 13 shown in FIG. 1, and a rearrangement process of commands is performed by accessing the buffer memory 13. However, as another method, as shown in FIG. 6, it is also possible to store a series of commands in a RAM 52 and a buffer memory 53, and then perform a rearrangement process of commands. This case will be explained below as a third embodiment of the invention.

FIG. 6 is a block diagram showing the configuration of the third embodiment according to the present invention. The same reference numerals as in FIG. 1 denote the corresponding part in FIG. 6. In a storage device 50 shown in FIG. 6, a control section 51 and a buffer memory 53 are arranged in place of the control section 41 and the buffer memory 13 shown in FIG. 1. A RAM (random access memory) 52 is newly arranged.

Figure 8:
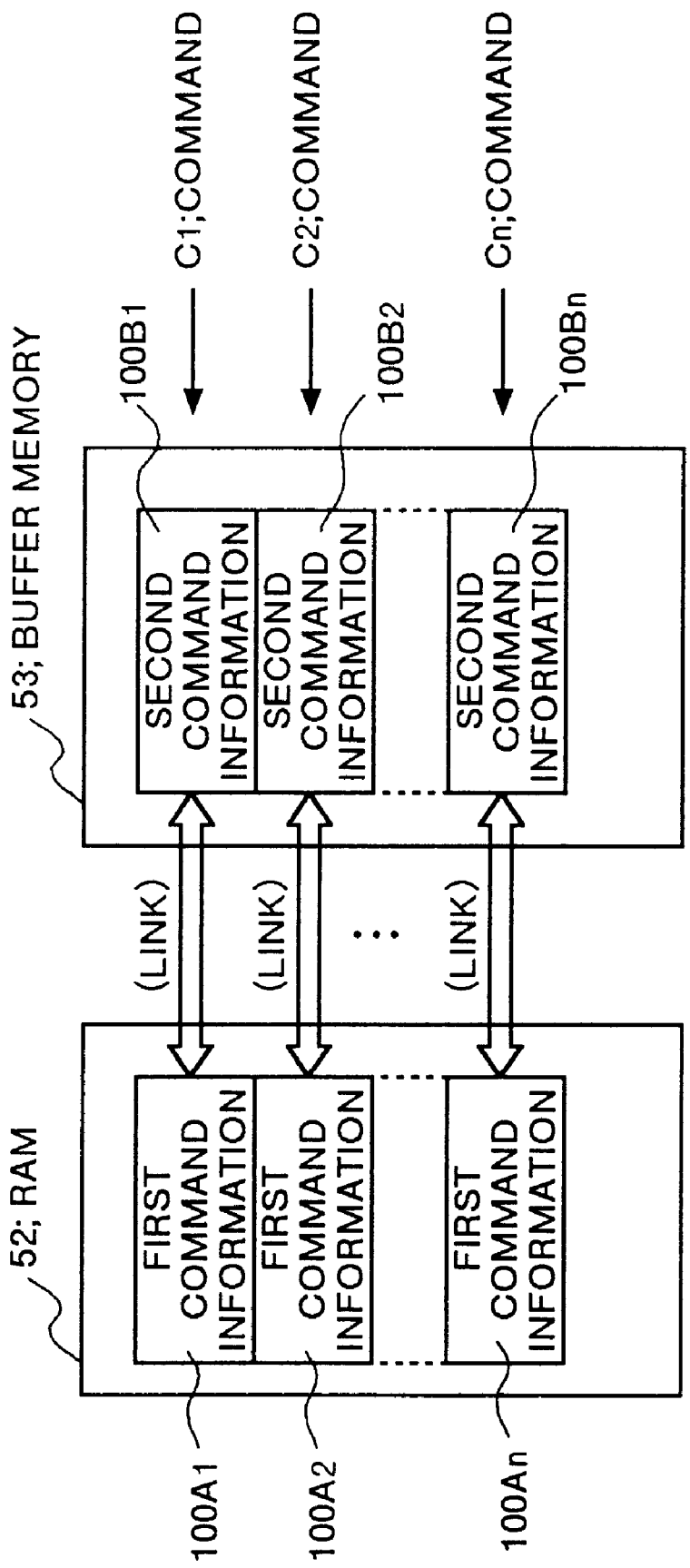
FIG. 8 is a diagram showing data structures in a RAM 52 and a buffer memory 53 shown in FIG. 6.

The control section 51 shown in FIG. 6 has a command separation function (to be explained later) in addition to the same function as that of the control section 41 explained above (see FIG. 1). The RAM 52 is a memory having an access (read/write) speed higher than that of the buffer memory 53 (buffer memory 13: see FIG. 1 and FIG. 9) and a capacity smaller than that of the buffer memory 53. In this RAM 52, pieces of first command information $100A_1$ to $100A_n$ shown in FIG. 8 are stored. The pieces of first command information $100A_1$ to $100A_n$ are parts of commands $C_1$ to $C_n$ transmitted from the host 30, and are pieces of information required for a rearrangement process of commands described in the first and second embodiments. Here, as the pieces of information required for the rearrangement process, information representing the types of commands, access positions on the magnetic disk 17, information related to the host 30 which issues the commands, pointer information of commands linked to the commands at the front and the rear, and the like are used.

In the buffer memory 53, pieces of second command information $100B_1$ to $100B_n$ are stored. The pieces of second command information $100B_1$ to $100B_n$ are pieces of information which are not required for a rearrangement of commands. Here, pieces of information which are not required for the rearrangement process are command information of a CDB form transmitted from the host 30, information representing whether or not the command information is being executed, error information, and the like. In this manner, the commands $C_1$ to $C_n$ from the host 30 are separated into the first command information $100A_1$ to $100A_n$ and the second command information $100B_1$ to $100B_n$.

Figure 7A:
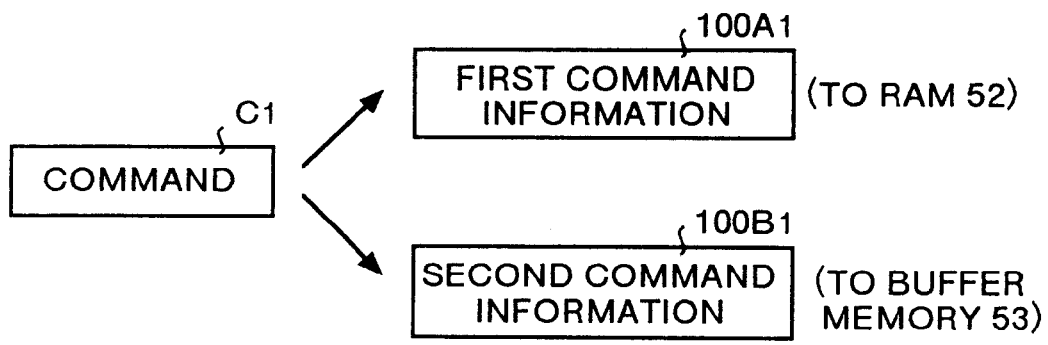
FIG. 7A to FIG. 7C are diagrams showing a separating operation of commands in a control section 51 shown in FIG. 6.

An operation of the third embodiment will be explained below. In this case, it is assumed that both of the information are not stored in the RAM 52 and the buffer memory 53 shown in FIG. 8. In this state, when the command $C_1$ shown in FIG. 7A is transmitted from the host 30, the command $C_1$ is received by the control section 51 through an SCSI and an I/F section 12. In this manner, the control section 51 separates the command $C_1$ into the first command information $100A_1$ and the second command information $100B_1$ as shown in FIG. 7A.

The control section 51 then stores the first command information $100A_1$ at the start address of the RAM 52, and stores the second command information $100B_1$ at the start address of the buffer memory 53. At this time, link information representing that the first command information $100A_1$ and the second command information $100B_1$ are linked to each other is stored in the RAM 52 and the buffer memory 53. In the third embodiment, it is also possible to specify the link relation, without storing the above link information, by respectively storing the first command information $100A_1$ and the second command information $100B_1$ in the RAM 52 and the buffer memory 53 such that the (relative) address of the first command information $100A_1$ coincides with the (relative) address of the second command information $100B_1$.

Figure 7B:
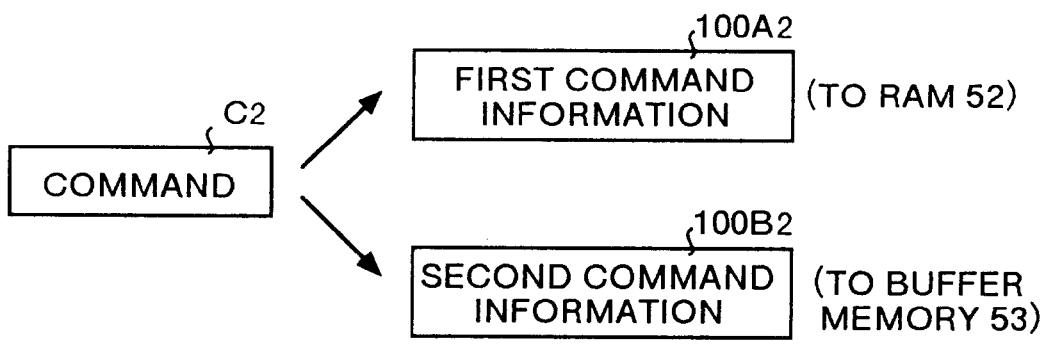

When the control section 51 receives the command $C_2$ (see FIG. 7B) from the host 30, the control section 51 separates the command $C_2$ into the first command information $100A_2$ and the second command information $100B_2$ by the same operation as described above, and then stores these pieces of information in the RAM 52 and the buffer memory 53 shown in FIG. 8. Thereafter, the control unit 51 separates the command to the first command information and the second command information whenever the command is received, and stores these to the RAM 52 and the buffer memory 53.

Figure 7C:
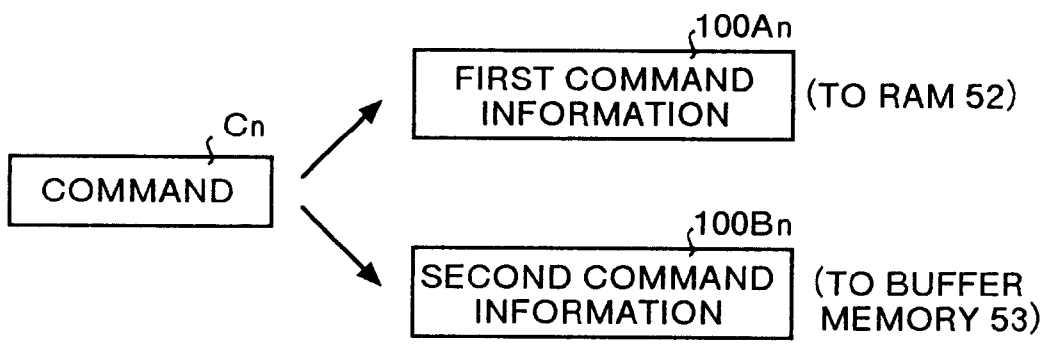

When the control section 51 receives the command $C_n$ (refer to FIG. 7C) from the host 30, after the control section 51 separates the command $C_n$ into the first command information $100A_n$ and the second command information $100B_n$ by the same operation as described above, these pieces of information are stored in the RAM 52 and the buffer memory 53 shown in FIG. 8. At this time, the same queue as the command queue $Q_3$ (see FIG. 2) explained above is generated by each of the RAM 52 and the buffer memory 53.

More specifically, a queue consisting of the pieces of first command information $100A_1$ to $100A_n$ is generated by the RAM 52 shown in FIG. 8, and these pieces of first command information $100A_1$ to $100A_n$ are pieces of information required for a rearrangement process of commands as described above. On the other hand, a queue consisting of the pieces of second command information $100B_1$ to $100B_n$ is generated by the buffer memory 53, and these pieces of second command information $100B_1$ to $100B_n$ are pieces of information which are not required for the rearrangement process of the commands as explained above.

The control section 51 executes the rearrangement process (see FIGS. 3 and 5) of the commands described in the first or second embodiment described above. In this case, the control section 51 accesses only the RAM 52 shown in FIG. 8 to execute the rearrangement process of the commands. More specifically, the pieces of first command information $100A_1$ to $100A_n$ are used as commands in the first or second embodiment, and the rearrangement process is executed.

Figure 9:
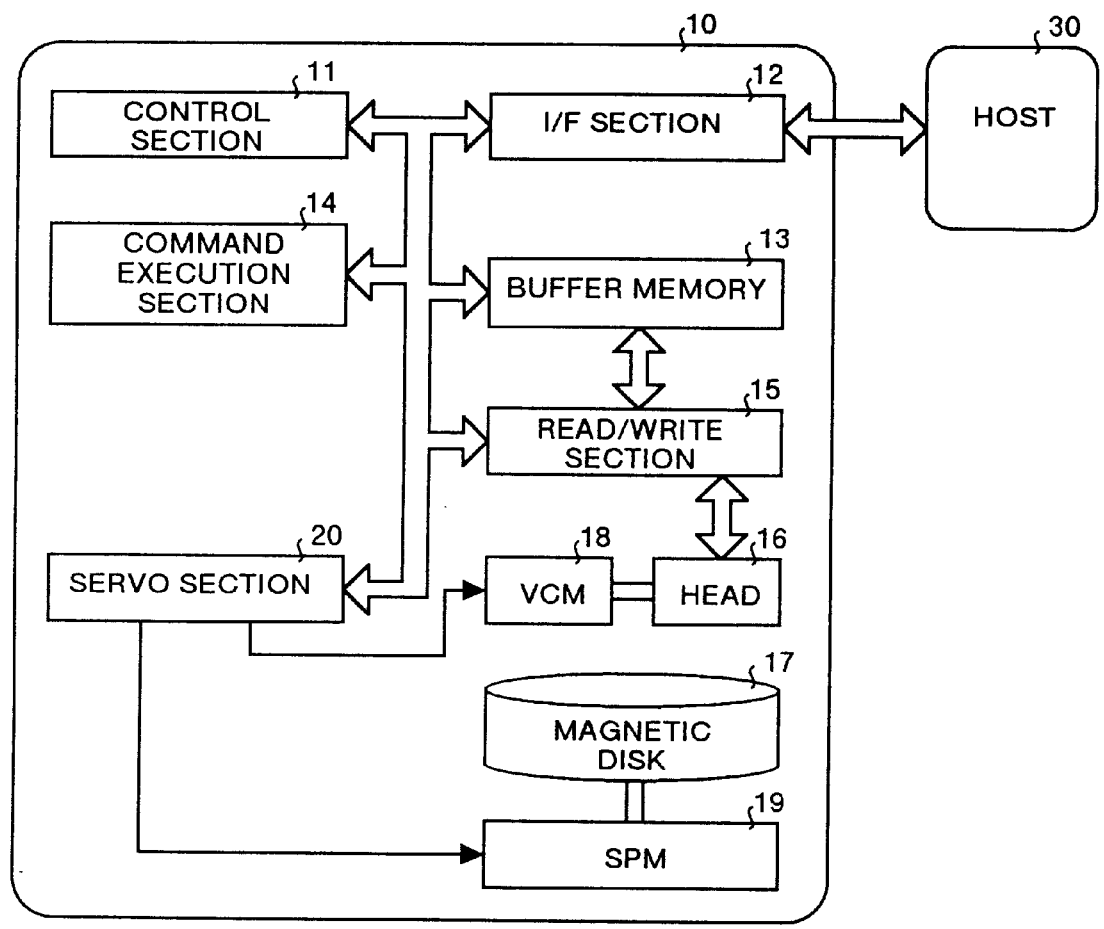
FIG. 9 is a block diagram showing the configuration of a conventional storage device 10.
Figure 10:
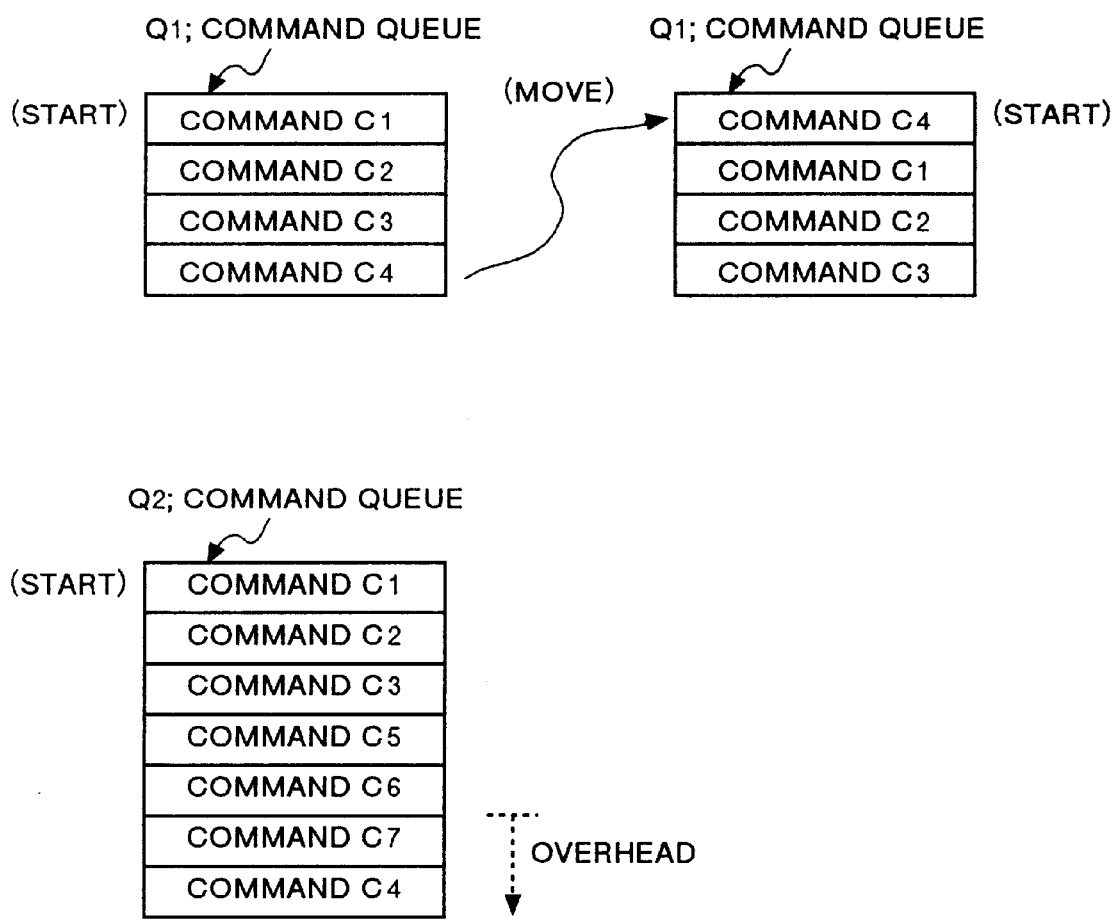
FIG. 10 is a diagram showing a command rearrangement process in the conventional storage device 10.

As explained above, according to the third embodiment, since the control section 51 accesses the RAM 52 which can be accessed at a high speed in the rearrangement process of the commands, the rearrangement process can be performed within a time shorter than that required for the rearrangement process in the conventional buffer memory 13 (see FIG. 9).

The first to third embodiments according to the present invention have been described above with reference to the accompanying drawings. However, concrete configurations of the present invention are not limited to the first to third embodiments, and changes and modifications of design and the like are effected without departing from the spirit and scope of the present invention. For example, two or three of the first to third embodiments may be combined to each other.

As has been described above, according to the first aspect of the invention, even in a case where all commands in a command queue are not searched, when a command satisfies a predetermined condition, the commands are rearranged such that the command is preferentially executed. Therefore, a time required for a rearrangement process of the commands can be made shorter than that in a prior art in which all commands in a command queue are subjected to searching.

Further, when there is a spare time when the command is searched by the searching unit, rearrangement of the commands is repeatedly performed. Therefore, searching precision can be advantageously improved.

According to the second aspect of the invention, since rearrangement of commands is performed such that a special command that can immediately return a status response to a host is executed in preference to the other commands, the number of commands in a command queue can be quickly reduced. Therefore, a time required for rearrangement of the commands to be executed later can be advantageously shortened.

According to the third aspect of the invention, commands are separated into first command information and second command information, and the second command information required for a rearrangement process is stored in the second memory which can be accessed at a high speed to access the second memory, so that the execution orders of the commands are rearranged. Therefore, since a time required for access to the second memory can be made shorter than that in a conventional storage device, a time required for a rearrangement process of the commands can be advantageously shortened.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A storage device which performs a predetermined operation on the basis of a command received from a host, said storage device comprising:

a head which accesses a recording medium;

a memory in which a command queue consisting of a plurality of commands received from the host is stored;

a searching unit for searching for a command to be executed after a command which is being executed, based on a predetermined condition from the command queue; and a rearrangement unit which rearranges the commands in the command queue, when said searching unit finds a command in which a time depending upon a relative distance between said head and said recording medium after execution of the command under execution is over is not longer than a predetermined time, so that the command found by said searching unit is preferentially executed, wherein said searching unit performs said searching within a predetermined searching time, and said rearrangement unit repeatedly performs rearrangement of the commands within said searching time.

2. The storage device according to claim 1, wherein said predetermined time is a time needed for a movement of the head from a head location after the execution of the command under execution is over, to a location for executing the next command to be executed.

3. The storage device according to claim 1, wherein said predetermined condition is to compare a seek time of a first command and a second command in the command queue, and find the command with the minimum time required for movement of the head from a head location after the execution of the command under execution is over to a location for executing the compared commands.

4. A storage device which performs a predetermined operation on the basis of a command received from a host, said storage device comprising:

a head which accesses a recording medium;

a memory in which a command queue consisting of a plurality of commands received from the host;

a searching unit for searching a command to be executed next to a command which is being executed based on a predetermined condition from the command queue; and a rearrangement unit which rearranges the commands in the command queue, when said searching unit finds a special command which can immediately return a status response to the host, so that the special command found by said searching unit is preferentially executed.

5. A storage device which performs a predetermined operation on the basis of a command received from a host, said storage device comprising:

a head which accesses a recording medium;

a separation unit for separating a plurality of commands issued by the host into first command information which is not required for a rearrangement process of the commands and second command information which is required for the rearrangement process;

a first memory for storing said first command information to make a queue;

a second memory, for storing said second command information linked to the first command information to make a queue, which can be accessed at a speed higher than that of access to said first memory;

a searching unit for accessing said second memory to search the second command information corresponding to a command to be executed next to a command under execution from the queue according to a predetermined condition; and a rearrangement unit for rearranging execution orders of the commands based on a result of search by said searching unit such that the command is preferentially executed.

6. A storage device which performs a predetermined operation on the basis of a command received from a host, said storage device comprising:

a head which accesses a recording medium;

a memory in which a command queue consisting of a plurality of commands received from the host is stored;

a searching unit for searching a command to be executed following a command which is being executed by comparing a seek time of a first command and a second command in the command queue, and finding the command with the minimum time required for movement of the head from a head location after the execution of the command under execution is over, to a location for executing the compared commands; and, a rearrangement unit which rearranges the commands in the command queue, when the time for the searching unit to find the next command to be executed is not greater than the time between a time when the execution of the command under execution is executed and a time when the execution is ended, so that the command found by said searching unit is preferentially executed.

* * * * *